United States Patent [19]

Nishikawa

[11] 4,422,346

[45] Dec. 27, 1983

[54] TILTABLE STEERING MECHANISM

[75] Inventor: Masumi Nishikawa, Toyoake, Japan

[73] Assignee: Aisin Seiki Kabushiki Kaisha, Kariya, Japan

[21] Appl. No.: 283,248

[22] Filed: Jul. 14, 1981

[30] Foreign Application Priority Data

Jul. 16, 1980 [JP] Japan .............................. 55-10049[U]
Jul. 18, 1980 [JP] Japan ........................... 55-102629[U]

[51] Int. Cl.$^3$ .............................................. B62D 1/18
[52] U.S. Cl. ...................................... 74/493; 280/775
[58] Field of Search ........................... 74/493; 280/775

[56] References Cited

U.S. PATENT DOCUMENTS

| 911,069 | 2/1909 | Perkins | 74/493 |
| 3,691,866 | 9/1972 | Berkes | 280/775 |
| 4,102,218 | 7/1978 | Naka | 74/493 |
| 4,335,625 | 6/1982 | Nishikawa | 74/493 |

FOREIGN PATENT DOCUMENTS

| 2360454 | 7/1978 | France | 74/493 |
| 56-28050 | 3/1981 | Japan | 74/493 |
| 1438508 | 6/1976 | United Kingdom | 74/493 |

Primary Examiner—Reinaldo P. Machado
Assistant Examiner—Alvin Chin-Shue
Attorney, Agent, or Firm—Sughrue, Mion, Zinn, Macpeak & Seas

[57] ABSTRACT

The tiltable steering mechanism is comprised of a first bracket adapted to be fixed to the vehicle body and a second bracket rotatably supporting the upper portion of the steering column pivotally connected to the first bracket. An infinitely adjustable latch mechanism is provided for continuously adjusting the angle between the first and second brackets. The latch mechanism is separable to permit a tilt-away operation in which the steering mechanism is tilted quickly to the upper limit to facilitate ingress and egress from the vehicle. Upon subsequent lowering of the steering mechanism, the latch mechanism will automatically re-engage at the previously adjusted position.

5 Claims, 5 Drawing Figures

U.S. Patent    Dec. 27, 1983    4,422,346
FIG.1
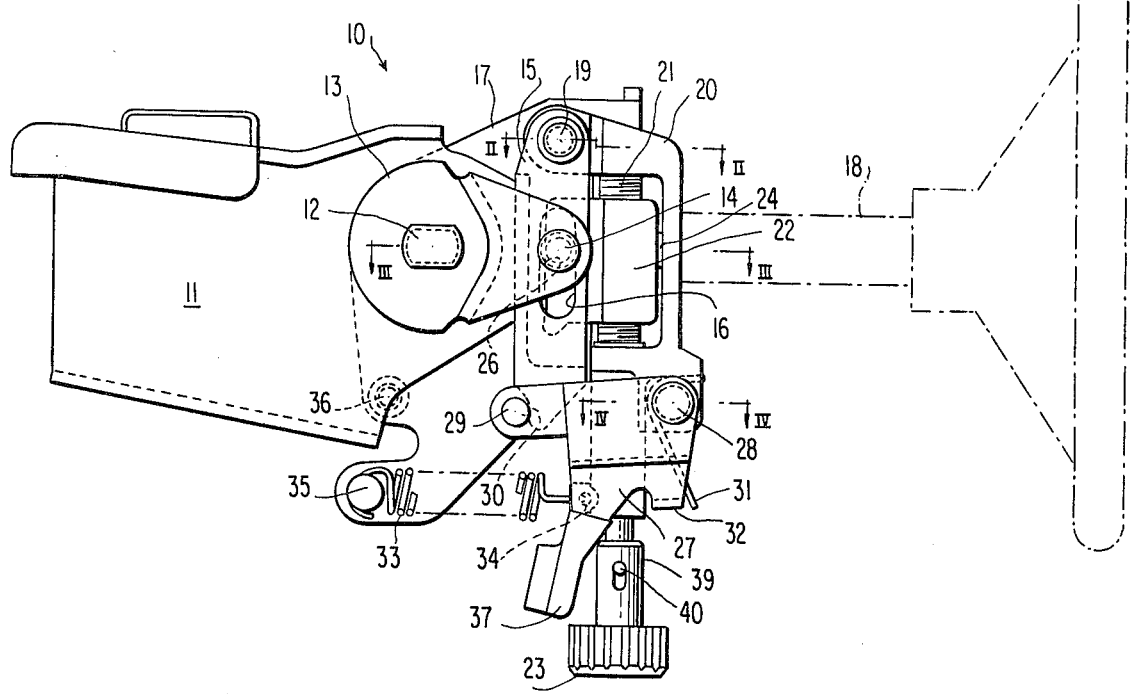
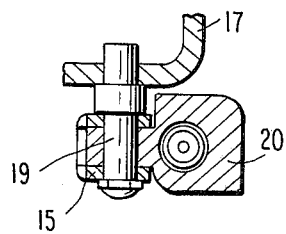
FIG.2
FIG.3
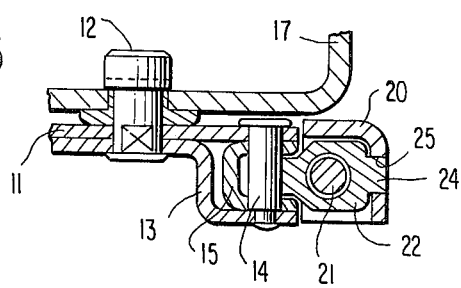
FIG.4
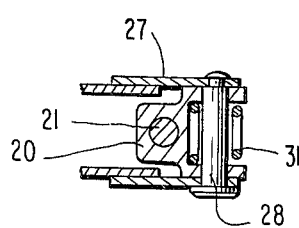
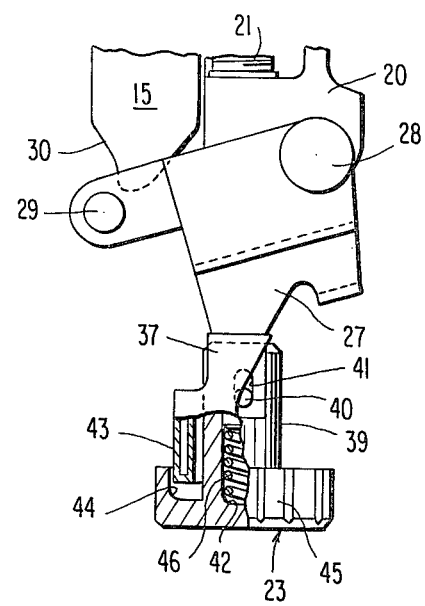
FIG.5

4,422,346

TILTABLE STEERING MECHANISM

BACKGROUND OF THE INVENTION

The present invention is directed to a tiltable steering mechanism and more particularly to a tiltable steering mechanism which is continuously adjustable upwardly and downwardly to any desired position and which will automatically return to the adjusted position after a tilt-away operation whereby the steering wheel is instantly tilted to the uppermost position to faciliatate ingress and egress from the vehicle.

A conventional tiltable steering mechanism is generally comprised of a stationary bracket mounted on the vehicle body structure and a movable bracket pivoted to the stationary bracket for permitting angular adjustment of the steering mechanism supported thereon. An arm portion of the movable bracket is provided with a toothed portion adapted to be engaged with the toothed portion of a latch member which is manually movable into and out of engagement with the toothed portion of the movable bracket. With the latch member out of engagement with the toothed portion of the movable bracket, the steering mechanism carried by the movable bracket may be tilted to any desired position whereupon the latch member will be re-engaged with the tooth portion of the movable bracket to secure the steering mechanism in the adjusted position. Such a tiltable steering mechanism is disclosed in U.S. Pat. No. 4,102,218 to Naka et al. granted July 25, 1978. Although the movable bracket is spring biased to move the steering mechanism to the uppermost position upon release of the latch member, the preferred angular driving position of the steering mechanism must be reflected after each such tilt-away operation of the steering mechanism.

SUMMARY OF THE INVENTION

The present invention provides a new and improved tiltable steering mechanism which obviates the aforementioned drawbacks of conventional tiltable steering mechanisms. The tiltable steering mechanism according to the present invention is continuously adjustable to any desired angular position and is capable of memorizing a selected angular position for automatic return to such angular position after a tilt-away operation of the tiltable steering mechanism.

The present invention provides a new and improved tiltable steering mechanism comprised of a stationary bracket, a movable bracket rotatably supporting a portion of the steering shaft pivotably connected to said stationary bracket, a first locking lever pivoted to said movable bracket by first pivot means and having an elongated slot therein extending radially relative to said first pivot means, flange means on said stationary bracket having a pin thereon slidably disposed in said slot, a tilt lever pivoted on said support bracket on said first pivot means, latch means adjustably mounted on said tilt lever for continuous adjustment toward and away from said first pivot means and having recess means for detachably engaging said pin, a second locking lever pivotally mounted on said locking lever on second pivot means, complimentary engaging means for detachably interconnecting said first and second locking levers, spring means normally biasing said latch means on said locking lever into engagement with said pin and operating means for moving said latch means toward and away from said first pivot means to adjust the angular position of said movable bracket relative to said stationary bracket and whereby upon disengagement of said first and second locking levers from each other, the tilt lever may be pivoted to disengage said latch means from said pin to permit a tilt-away operation of the movable bracket while ensuring re-engagement of the latch means and pin upon downward movement of the movable bracket to the adjusted position prior to the tilt-away operation.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a side elevation view of the tiltable steering mechanism according to the present invention.

FIG. 2 is a partial sectional view taken along the line II—II in FIG. 1.

FIG. 3 is a partial sectional view taken along the line III—III in FIG. 1.

FIG. 4 is a partial sectional view taken along the line IV—IV in FIG. 1.

FIG. 5 is a partial side elevation view, partly in section, showing the first and second lock levers in uncoupled condition for adjustment of the tiltable steering mechanism.

DETAILED DESCRIPTION OF THE INVENTION

The tiltable steering mechanism 10 as best seen in FIG. 1 is comprised of a break-away bracket 11 which is adapted to be fixed to the vehicle body in the conventional manner. A substantially U-shaped steering column bracket 17 is pivoted to the bracket 11 by means of two pivot pins 12, only one of which is shown in FIGS. 1 and 3. The upper portion of the steering shaft 18 having a steering wheel thereon and illustrated in dot-dash lines in FIG. 1 is adapted to be rotatably supported in the bracket 17 in the conventional manner. The pivot pin 12 upon which the bracket 17 is rotatably mounted is non-rotatably supported in a complimentary aperture in the fixed bracket 11 and a fixed sub-bracket 13 is non-rotatably mounted on the end of the pivot pin 12. The sub-bracket 13 is bent so that the righthand end thereof as viewed in FIGS. 1 and 3 is disposed in spaced parallel relation to the righthand end of the fixed bracket 11.

A first locking lever 15 is pivotally supported on the bracket 17 by means of a pivot pin 19 disposed substantially above the righthand end of the sub-bracket 13 as viewed in FIG. 1. The lever 15 is provided with an elongated slot 16 extending radially with respect to the pivot pin 19. A pin 14 is secured between the parallel spaced apart ends of the brackets 11 and 13 as best seen in FIG. 3 and the pin is slidably disposed within the slot 16 in the first locking lever 15.

A tilt lever 20 having a substantially C-shaped upper portion is mounted for pivotal movement on the pivot pin 19 adjacent the first locking lever 15. An adjusting shaft 21 is mounted for rotation in the tilt lever 20 and is provided with a threaded portion disposed between the two parallel arms of the C-shaped portion of the tilt lever 20. A latch member 22 is threaded on the shaft 21 and an operating knob 23 is non-rotatably secured to the end of the shaft 21 for axial sliding movement relative thereto. A projecting portion 24 is formed on the right side of the latch 22 and is guided for sliding movement within a slot 25 formed in the tilt lever 20. A notch 26 is provided on the left side of the latch 22 opposite the projection 24 for the reception of the pin 14.

A second locking lever 27 is pivotally supported on the lower end of the tilt lever 20 by means of a pivot pin 28. A latch pin 29 on the second locking lever 27 is engagable with a tapered portion 30 formed at the lower end of the first locking lever 15 for the purpose of holding the pin 14 within the notch 26 on the latch member 22. A spring 31 is wrapped about the pivot pin 28 with one end thereof disposed in engagement with the lower end of the tilt lever and the other end thereof disposed in engagement with an inwardly bent portion 32 of the second locking lever 27. The spring 31 urges the second locking lever 27 in the clockwise direction about the pin 28 to normally bias the pin 29 of the second locking lever 27 into engagement with the tapered portion 30 of the first locking lever 15.

A coil spring 33 is secured at one end in a hole 34 in the lower end of the tilt lever 20 and at the other end to a pin 35 fixed to the lower end of the steering column support bracket 17 thereby urging the tilt lever 20 in the clockwise direction about the pivot pin 19 so as to always bias the latch member 22 into engagement with the pin 14. Another pin 36 is secured to the lower end of the steering column support bracket 17 above the pin 35 and is adapted to be engaged by another spring (not shown) for biasing the steering column support bracket 17 in the counter clockwise direction about the pivot pins 12 to tilt the steering wheel upwardly during a tilt-away operation as will be described hereinafter.

A lever arm 37, integral with the second locking lever 27 is provided with a portion 43 adapted to be engaged in an annular groove 44 formed in one side of the knob 23. The knob 23 is also formed with a central bore 42 having a spring 46 therein adapted to bias the knob 23 away from the end of the shaft 21 to the limit permitted by the pin 40 on the end of the shaft 21 which is slidably disposed in an elongated slot 41 formed in the cylindrical shaft portion 39 of the knob 23.

When it is desired to ajust the tiltable steering mechanism upwardly or downwardly relative to the position shown in FIG. 1, the second locking lever 27 is pivoted from the position shown in FIG. 1 to the position shown in FIG. 5 thereby disengaging the pin 29 on the second locking lever 27 from the tapered portion 30 of the first locking lever 15. Upon moving the knob body 45 of the operating knob 23 upwardly against the force of the spring 46, the portion 43 of the lever arm 37 will be engaged in the annular groove 44 to prevent the clockwise pivotal movement of the second locking lever 27 while the knob 23 is rotated to adjust the position of the steering mechanism. By rotating the knob 23 in one direction, the latch member 22 will move upwardly along the threaded portion of the shaft 21 and upon rotation of the knob 23 in the opposite direction, the latch member 22 will move downwardly along the threaded portion of the shaft 21. The latch member 22 is adjustable to the extent permitted by the arms of the C-shaped portion of the tilt lever 20 which extend above and below the latch member 22. Since the stationary pin 14 is engaged with the notch 26 of the latch member 22, the relative position between the pin 14 and the pivot pin 19 will be varied to thereby adjust the tilt of the steering mechanism. After the tilt of the steering mechanism has been adjusted, the portion 43 of the lever arm 37 is disengaged from the annular groove 44 of the knob by allowing the spring 46 to bias the knob axially downwardly as viewed in FIG. 5. The spring 31 will then pivot the second locking lever in the clockwise direction to bring the pin 29 into engagement with the tapered portion 30 of the first locking lever 15 to hold the steering mechanism in the newly-adjusted position.

For a quick tilt-away operation of the steering mechanism whereby the steering mechanism will be tilted upwardly to the maximum permissible degree to facilitate ingress and egress from the passenger compartment, the second locking lever 27 will be pivoted in the counter clockwise direction as viewed in FIG. 1 to disengage the pin 29 from the tapered portion 30 of the first locking lever 15. Subsequent pivotal movement of the tilt lever 20 about the pivot pin 19 in the counter-clockwise direction will disengage the stationary pin 14 from the notch 26 in the latch member 22, thereby allowing the spring (not shown) which is engageable with the pin 36 on the steering column bracket 17 to bias the steering column bracket 17 and the associated steering mechanism 18 upwardly to the limit permitted by the elongated slot 16 formed in the first locking lever 15.

When it is desired to return the steering mechanism 18 to the previously adjusted position immediately prior to the tilt-away operation it is only necessary to tilt the steering mechanism 18 and bracket 17 in the clockwise direction about the pivot pins 12 until the pin 14 snaps into the recess 26 of the latch member 22. During the downward tilting operation of the steering mechanism 18, the spring 33 wil bias the left-hand edge of the latch member 22 against the pin 14 so that the pin 14 will immediately be engaged in the notch 26 when the steering mechanism reaches the previously adjusted position. Simultaneously, the spring 31 will bias the second locking lever 27 in the clockwise direction as viewed in FIG. 1 to bring the pin 29 into locking engagement with the end of the first locking lever 15. Thus, the tiltable steering mechanism according to the present invention is provided with a memory function during the tilt-away operation of the steering wheel which enables the steering wheel to be quickly and automatically restored to the desired position.

While the invention has been particularly shown and decribed with reference to a preferred embodiment thereof, it will be understood by those in the art that various changes in form and details may be made therein without departing from the spirit and scope of the invention.

What is claimed is:

1. A tiltable steering mechanism comprising a first bracket adapted to be secured a vehicle body, a second bracket for rotatably supporting a steering shaft pivotally mounted on said first bracket, a sub-bracket secured to one side of said first bracket and having pin means at one end thereof, a first pivot pin secured to second bracket substantially above said pin means, a first locking lever pivotally mounted on said first pivot pin and having an elongated slot slidably engageable with said pin means, a tilt lever pivotally mounted on said first pivot pin, a second pivot pin secured to said tilt lever in spaced relation to said first pivot pin, a second locking lever pivotally supported on said second pivot pin, complementary locking means on said first and second locking levers for normally holding said tilt lever adjacent said first locking lever and latch means adjustably mounted on said tilt lever for movement toward and away from said first pivot pin and engageable with said pin means to hold said second bracket in adjusted position relative to said first bracket.

2. A tiltable steering mechanism as set forth in claim 1 further comprising shaft means rotably mounted in said tilt lever, complementary screw-threaded means on said shaft means and said latch means engageable with each other and means for rotating said shaft means for adjustably moving said latch along said shaft means while engaged with said pin means for continuously adjusting the position of said second bracket relative to said first bracket.

3. A tiltable steering mechanism as set forth in claim 2 wherein said means for rotating said shaft means is comprised of a knob secured to said shaft for rotation therewith and longitudinally movable lengthwise of said shaft adjacent one end, means for limiting sliding movement of said knob, spring means normally biasing said knob away from said latch means and complementary engageable means on said second locking lever and said knob for holding said second locking lever in unlocked position relative to said first locking lever.

4. A tiltable steering mechanism as set forth in claim 3 further comprising spring means operatively associated with said tilt lever and said second locking lever for normally biasing said second locking lever into locking engagement with said first locking lever.

5. A tiltable steering mechanism as set forth in claim 1 further comprising spring means operatively connected to said tilt lever and said second bracket for normally biasing said latch means against said pin means to automatically bring said latch means into locking engagement with said pin means upon downward tilting movement of said second bracket after a tilt-away operation.

* * * * *